United States Patent
Bachelor et al.

(10) Patent No.: US 10,620,990 B2
(45) Date of Patent: Apr. 14, 2020

(54) LEGACY APPLICATION MIGRATION TO REAL TIME, PARALLEL PERFORMANCE CLOUD

(71) Applicant: UST GLOBAL (SINGAPORE) PTE. LTD., Singapore (SG)

(72) Inventors: Douglas Wiley Bachelor, Groton, MA (US); Raul Hugo Curbelo, Sturbridge, MA (US); Elizabeth Winters Elkins, Pompano Beach, FL (US); Christie Patrick McGrath, Nashua, NH (US); Simon Byford Moss, Cos Cob, CT (US); Thomas C. Fountain, Madison, NJ (US)

(73) Assignee: UST Global (Singapore) Pte. Ltd., Singapore (SG)

( * ) Notice: Subject to any disclaimer, the term of this patent is extended or adjusted under 35 U.S.C. 154(b) by 361 days.

(21) Appl. No.: 15/419,937

(22) Filed: Jan. 30, 2017

(65) Prior Publication Data

US 2017/0139741 A1 May 18, 2017

Related U.S. Application Data

(63) Continuation of application No. 13/442,353, filed on Apr. 9, 2012, now Pat. No. 9,558,441.

(60) Provisional application No. 61/472,812, filed on Apr. 7, 2011.

(51) Int. Cl.
G06F 9/48 (2006.01)
G06F 9/54 (2006.01)
G06N 3/02 (2006.01)
H04L 29/08 (2006.01)
G06Q 10/06 (2012.01)

(52) U.S. Cl.
CPC .......... *G06F 9/4843* (2013.01); *G06F 9/541* (2013.01); *G06N 3/02* (2013.01); *G06Q 10/06* (2013.01); *G06Q 10/067* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2003/0083782 A1* | 5/2003 | Borrego | ............... | G06F 3/0601 700/245 |
| 2004/0223009 A1* | 11/2004 | Szladovics | ............. | G06F 9/451 715/760 |
| 2005/0223392 A1* | 10/2005 | Cox | ....................... | G06Q 10/06 719/328 |
| 2010/0064033 A1* | 3/2010 | Travostino | ............. | H04L 67/20 709/220 |

* cited by examiner

*Primary Examiner* — Umut Onat
(74) *Attorney, Agent, or Firm* — Nixon Peabody LLP

(57) ABSTRACT

A system for operating a legacy software application is presented. The system includes a distributed processing service. A wrapper software object is configured both to receive processing requests to a legacy software application from outside the distributed processing service and to send the processing requests using the distributed processing service. Additionally, an encapsulated software object includes the legacy software application and an exoskeleton connection service. The exoskeleton connection service is both configured to accept processing requests from the distributed processing service, and mapped to an application programming interface of the legacy software application.

11 Claims, 4 Drawing Sheets

LEGACY APPLICATION MIGRATION TO REAL TIME, PARALLEL PERFORMANCE CLOUD

CROSS-REFERENCE TO RELATED APPLICATIONS

This application is a continuation of U.S. patent application Ser. No. 13/442,353 entitled "Legacy Application Migration To Real Team, Parallel Performance Cloud", which was filed on Apr. 9, 2012, and which claims the benefit of U.S. Provisional Patent Application No. 61/472,812, which was filed Apr. 7, 2011, and which in turn claims the benefit of U.S. patent application Ser. No. 12/870,348 filed on Aug. 27, 2010 and entitled "System and Method For Employing The Use Of Neural Networks For The Purpose Of Real-Time Business Intelligence And Automation Control", all of which are incorporated herein by reference.

TECHNICAL FIELD

The present invention relates to cloud computing, parallel processing, distributed computing, fault tolerance, and load balancing and more particularly, relates to a system and method for providing legacy software applications to be incorporated into a massively parallel and distribution processing model in the Cloud.

BACKGROUND

Cloud computing is considered one of the top transformational IT changes and trends in 2010 and onwards. Cloud computing provides a scalable, dynamic, and distributed infrastructure for enabling applications to dynamically obtain and utilize computing resources on demand.

Most businesses have existing computer software applications that are not engineered or architected for cloud computing. Many existing applications cannot perform distributed and parallel processing and are unable to be deployed on an elastic cloud computing environment without significant changes to the existing applications' source code and application architecture. The challenge is applying a cost effective and simple migration and transformation process for legacy applications and products so that they can be incorporated into the cloud computing environment.

A legacy system or application program is a previously deployed third party or internally developed customer application that continues to be used, typically because it still functions for the users' needs or is too expensive to replace, even though newer technology or more efficient methods of performing a task are now available. Legacy applications include programs having JAVA® command lines, client and server applications based on JAVA thin client, MICROSOFT® thin client and server-based applications, Client/Server applications, Client workstation applications, third party independent software vendor applications, and proprietary client applications running on proprietary architectures and operating systems. Legacy application programs are typically serially programmed, linear in performance, residing in only one data center and with a limited number of users constrained by geographic or business location.

To implement an existing legacy application in the cloud computing environment and enable the application to be distributed, parallel, and demand-elastic is a very expensive and time-consuming activity. The existing application architecture and source code needs to be re-factored and significantly rewritten, tested extensively, and re-integrated with its existing applications.

The cost and time to implement such a legacy application re-write can exceed the original cost and development time. Given these impediments, businesses are unable to adapt their existing applications to the cloud computing environment. The new Cloud paradigm offers huge business and technical value including parallel processing, distributed, use anywhere, high performance, high resiliency, high accessibility and high availability.

This significant divergence in technology deployment and accessibility creates a significant challenge: the cost effective and manageable ability to migrate applications, best processes and institutionalized intellectual property from serial, linear, data center or application confined applications to a new technology paradigm of agile, competitive, massively performed, use anywhere and broadly distributed/accessible functions. It is this challenge that the invention specifically addresses.

Accordingly, the objective of the present invention is to provide a non-intrusive and assimilation model which enables these legacy applications to be transformed from standalone, serial-based computing to highly distributed, parallel processing and cooperating cloud application services. The innovation combines the cloud-centric, distributed, and parallel processing neuron platform infrastructure with a suite of legacy wrapper libraries to assimilate or "wrap" and encapsulate legacy applications and enable them to operate within the neuron cloud computing platform.

The present invention incorporates technology and process innovation, using the assignee's distributed neuron platform computing design and high performance, highly resilient virtual server for the migration of legacy applications to cloud that is simple, quick and a fraction of the cost of traditional migration and porting solutions and referred to herein as the neuron platform or neuron platform and technology or neuron technology.

SUMMARY

A system for operating a legacy software application is presented. The system includes a distributed processing service. A wrapper software object is configured both to receive processing requests to a legacy software application from outside the distributed processing service and to send the processing requests using the distributed processing service. Additionally, an encapsulated software object includes the legacy software application and an exoskeleton connection service. The exoskeleton connection service is both configured to accept processing requests from the distributed processing service, and mapped to an application programming interface of the legacy software application.

Additionally, there can be at least two of the encapsulated software objects in the system for operating a legacy software application.

The system for operating a legacy software application can also include a load and queue manager configured to select an encapsulated software object from the at least two encapsulated software objects, as well as a dispatcher software object configured to receive the request sent by the wrapper software object and send the request to the selected encapsulated software object.

The load and queue manager can include a load balance software object configured to monitor the at least two encapsulated software objects, and a queue management software object configured to monitor a queue of units of work sent to one of the at least two encapsulated software objects.

The load and queue manager can be configured to select the selected encapsulated software object in a round robin of the at least two encapsulated software objects. The load and queue manager can be configured to select the selected encapsulated software object based on a threshold.

The load and queue manager can be configured to cause an additional encapsulated software object to be created if the load and queue manager determines that each of the at least two encapsulated software objects are unavailable. The system for operating a legacy software application can have a database configured to store a partial result of a previous execution of the encapsulated software object, and the load and queue manager can be configured to use the partial result as a parameter of the additional encapsulated software object.

The dispatcher object can be configured to increment an in-flight count each when it sends a request to the selected encapsulated software object, and the system for operating a legacy software application can also include a complete message object that can be configured to decrement the in-flight count upon receiving an indication that the selected encapsulated software object has completed processing the request.

A method for operating a legacy software application is also presented. A wrapper object in a cloud computing environment that includes a distributed processing service maps a processing request written in an application programming interface of a legacy software application to the protocols of the distributed processing service. The wrapper object sends the mapped processing request to a dispatcher object through the distributed processing service. The dispatcher object sends the mapped processing request both to a load balance object and to a queue management object through the distributed processing service. Either the load balance object or the queue management object deploys an instance of an encapsulated software object into the cloud computing environment based on a load evaluation. The dispatcher sends the mapped processing request to the instance of the encapsulated software object. The instance of the encapsulated software object re-maps the mapped request to the application programming interface of the legacy software application. An instance of the legacy software application within the encapsulated software object executes the re-mapped request. The mapped processing request can be modified by an additional software object.

Another system for operating a legacy software application is presented. The system includes a distributed processing service. The system also includes a wrapper software object that is configured both to receive processing requests to a legacy software application from outside the distributed processing service and to send the processing requests using the distributed processing service. Additionally, there are at least two of an encapsulated software object that has the legacy software application and an exoskeleton connection service. The exoskeleton connection service is both configured to accept processing requests from the distributed processing service, and mapped to an application programming interface of the legacy software application. There is also a master dispatcher object configured to receive the request sent by the wrapper software object and send the request to one of at least two encapsulated software objects. Further, the system includes a slave dispatcher object configured to perform the functions of the master dispatcher object in the event communication between the master dispatcher object and the slave dispatcher object are disrupted. The master dispatcher object and the slave dispatcher object can be configured to operate on different servers of the cloud computing environment.

DESCRIPTION OF THE DRAWINGS

These and other features and advantages of the present invention will be better understood by reading the following detailed description, taken together with the drawings wherein.

DESCRIPTION OF THE INVENTION

Figure 1:
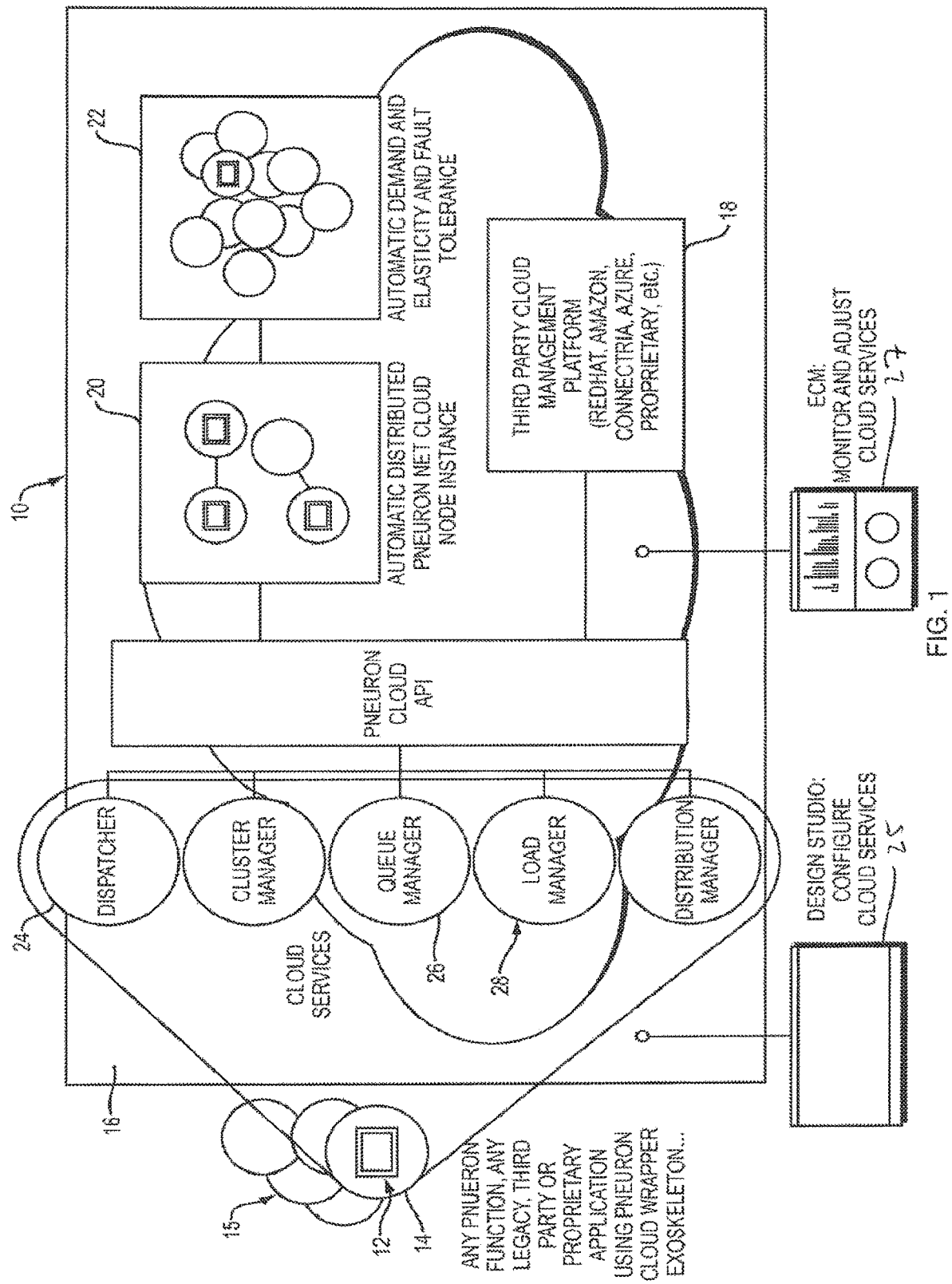
FIG. 1 is a schematic diagram of a neuron cloud environment in which a neuron wrapped legacy application interacts in accordance with the present invention.

The attached drawings and description (beginning with FIG. 1) highlight the neuron server ("Cortex") environment 10 in accordance with the present invention and its ability quickly, cost effectively and seamlessly "wrap" existing products 12 with a high performance API 14 and connect seamlessly to the neuron Cloud Virtual Server (Cloud Cortex) 16. The neuron server 16 has an interface to commercial cloud management systems 18. Different cloud management systems and environments can be supported by extending the cloud management adapter library and not affecting the overall neuron platform. In this manner, cloud services can be monitored and adjusted 27 while also enabling cloud services to be configured 25.

The external interface (wrapper API 14) enables an existing software product 12 to fully leverage massively parallel, highly distributed, horizontally and vertically resilient and available scale and so increase in performance through neuron parallel processing, automatically clone multiple instances 20 of the same application to ensure volume and load is managed in parallel (rather than serially in current solutions) and enable access and instantiation of the application anywhere within the cloud while maintaining automatic demand and elasticity and fault tolerance 22.

The present invention features an innovative process and technology within its neuron platform service that enables legacy/third party non-cloud designed software applications to be incorporated into a massively parallel and distribution processing model in the Cloud. The process is made up of a number of simple steps using the neuron technology wherein:

A. Existing legacy applications are "wrapped" with a neuron service Interface or "Wrapper"/"Exoskeleton". These "wrappers" are incorporated into a neuron wrapper library and preconfigured and enable "off the shelf" available interface instantiations specifically mapped to the target application's API. The "wrapper" is best considered an exoskeleton connection service which includes an encapsulation of an API, all base neuron functions and characteristics, security logic specific to the technology and services enabling the connection to the hyper fast, resilient, clustered neuron "cortex" Platform residing in the cloud. Wrappers are off the shelf and aligned to the specific type of technology including:

JAVA based command-level programs;
JAVA based Thin client server based applications;
MICROSOFT WINDOWS® Thin client server based applications;
Fat Client applications;
Third Party applications; and
Mainframe applications.

Each "wrapper", once deployed, allows applications to be cloud enabled including parallel processing, on-demand vertical and horizontal scale, auto-cloning to enable load sharing and deep resiliency, high availability and clustering in either private or public cloud.

The neuron solution is agnostic to the interface type or application requirements—Database, a Service, an abstract, table interface, HTTP sniffer or any number of methods to ensure maximum performance and connectivity.

These wrappers, in simple terms, enable different applications to interact transparently with the neuron platform.

Figure 2:
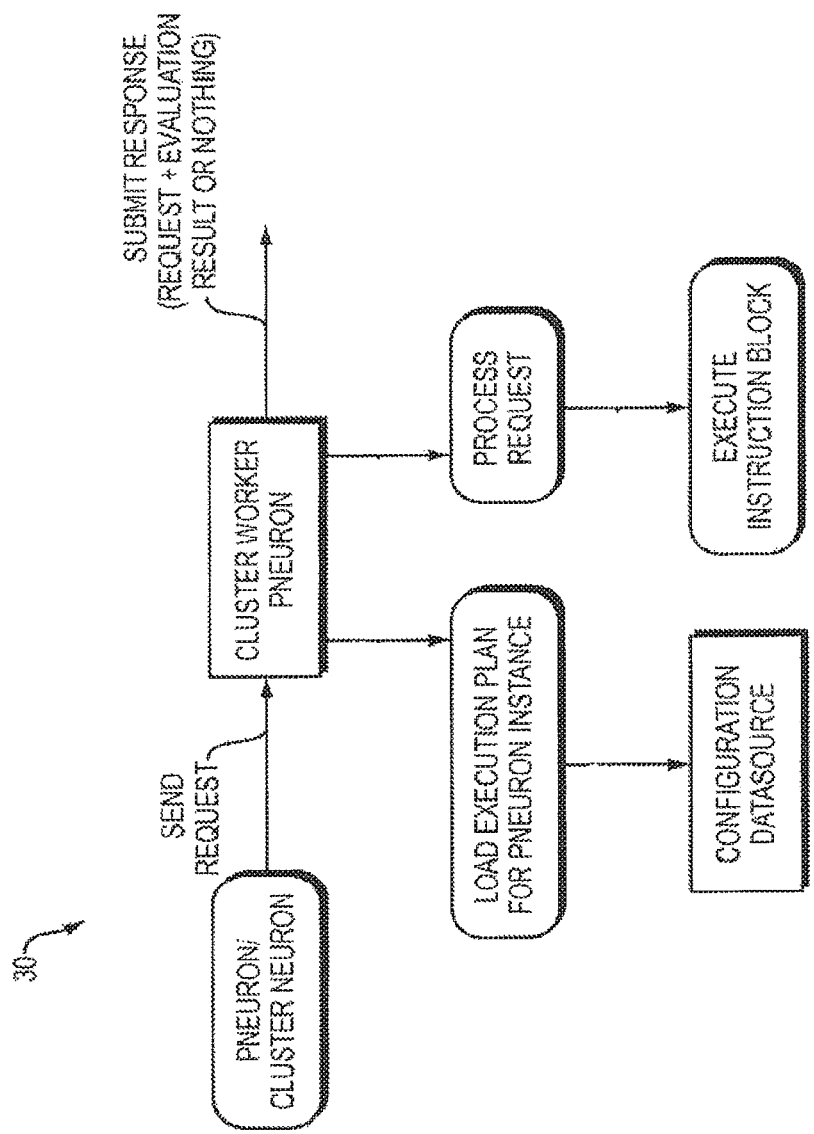
FIG. 2 is a flowchart illustrating the legacy application wrapper invocation model in accordance with the teachings of the present invention.

An example of a wrapper invocation model is provided as 30, FIG. 2. FIG. 2 shows the cluster worker pneuron loads the execution plan for a pneuron instance and configures the data source. The cluster worker pneuron processes the request and executes the instruction block. The pneuron cluster sends a request to the cluster worker pneuron. After the processing, the cluster worker pneuron submits the response. The execution plan concept is as follows:

invoke(method1, paramlist)
invoke(method2, paramlist)
. . .
Invoke(method3, paramlist)

Figure 3:
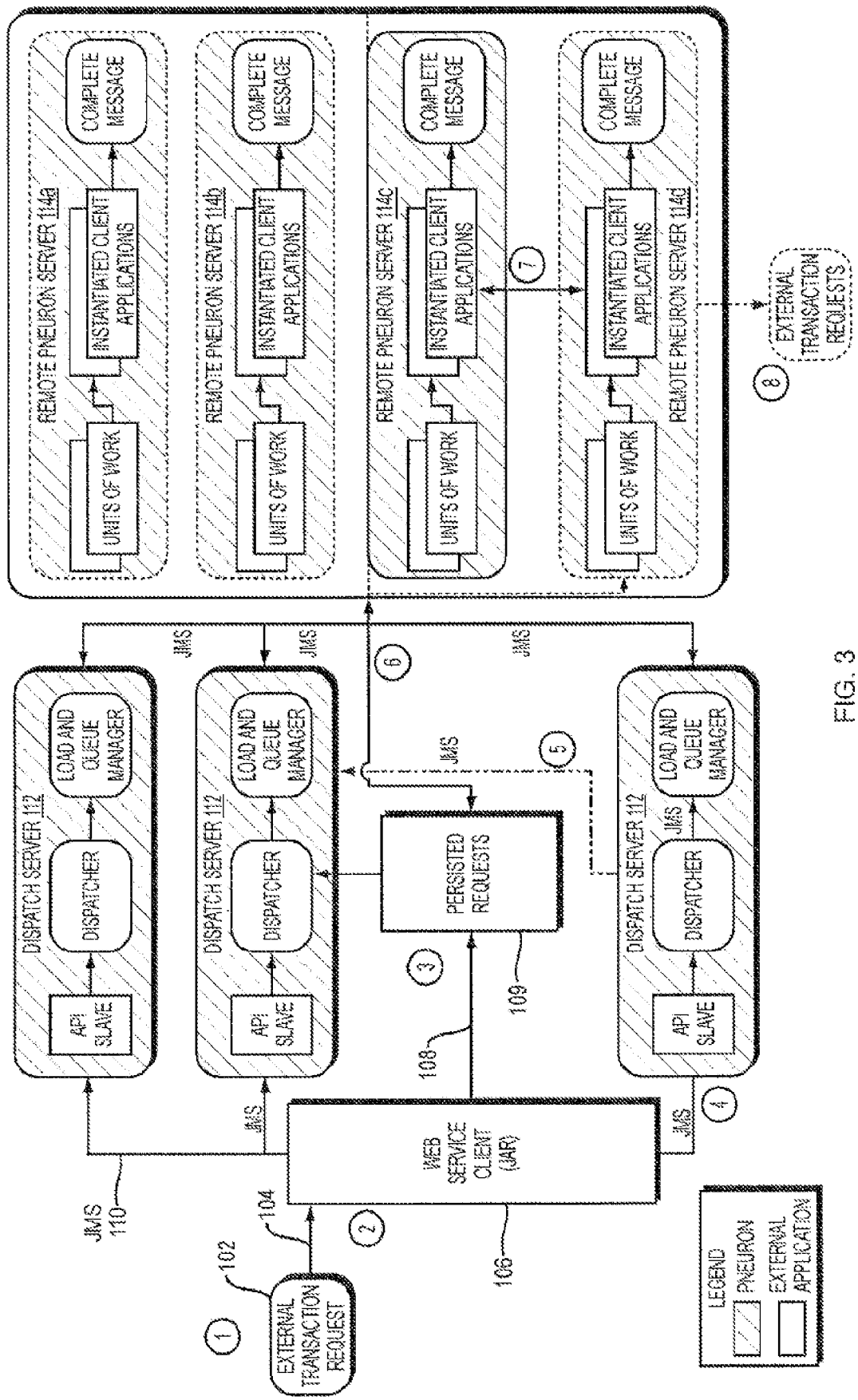
FIG. 3 is a diagram and flowchart illustrating the runtime processing model for a legacy application wrapped with a neuron operable on the neuron based cloud system in accordance with the teachings of the present invention.

If required, the present invention can store partial results from previous executions and use those as parameters depending on the complexity of the operation at hand. The invoke method shown in FIG. 3 is based on the reflection process. In this way, the client can provide JAVA archive (JAR) files or provide from the beginning a collection of JAVA source files that will be incorporated in the project from an early stage, or simply have them added at runtime as a JAR type file import. In this way, the client has the possibility to use different calls from different class instances (actually object instances for those classes) and organize those in a way (instruction code block) that will allow the client to organize the logic and create the proper integration of the code.

A sample call (concept) is shown below:

Aux inst1val=objConf1instance.invoke("methodconfigname1", paraminputList)
Aux inst2val=objConf1instance.invoke("methodconfigname1", paraminputList.Inst1val)
. . .
Rez instWval=objconfxinstance.invoke("methodw",parameters)
. . .
Rez instNval=objconfxinstance.invoke("methodn",parameters)
Result=OriginalXmlRequest+InstWval+InstNval (tags)

Once the applications are "wrapped", the applications are represented as neurons 15, FIG. 1, within the neuron Platform. The applications can then be incorporated into neuron networks and linked to the different neuron applications, including the Design Studio 25, Enterprise Control Manager 27, and the Admin application 18. The wrapped legacy neurons 15 now have configuration plans established. During the runtime processing, the neuron "cortex" platform orchestrates the remote instances of the configured neuron networks and enables the target legacy application to initiate multi-threaded requests, transmit and fully utilize a high availability, elastic and resilient architecture.

This "cortex" platform is a high performance, cloud enabled virtual server that enables the wrapped legacy application 15 to dynamically create and remove new cloud nodes and automatically deploy new application images with remote instances of the legacy application operating within the neuron platform. Specific functions applied include: auto load share; distribution and accessibility across multiple data centers to utilize capacity anywhere within the cloud; auto-clone as and when necessary for automated capacity and performance balancing; scale vertically and horizontally without manual initiation; auto-restart in different location if the application encounters critical errors or failure to operated; and seamlessly integrates with other applications within the cloud as if the application has been fully and completely reconfigured for distributed, virtualized cloud operation.

The API Wrapper neuron 14 provides a common interface and facility for receiving and processing external application requests. The API neuron marshals these requests to the Dispatcher neuron 24 for evaluation and processing.

The Dispatcher neuron 24 transmits the durable messaging requests to the Intelligent Load Balance 28 and Queue Management 26 neurons, which are monitoring the neuron remote worker instances and work queues and assigning work to the legacy applications. Based on load evaluation, the Intelligent Load Balance and Queue Management neurons instantiates new cloud nodes based on demand and automatically propagate another remote instance and distributes work.

The legacy application wrapped neuron 15 performs its work and then interacts with external applications automatically. The API Wrapper neuron interacts with Master neuron components, which manage requests, keep counts of work in process, perform load balancing, marshal work to distributed wrapped legacy application instances, instantiate new instances of the legacy applications and remove instances based on load and threshold levels.

External transaction requests 102, FIG. 3, occur through HTTP requests 104. External transaction requests will initiate an API request to the Web Service Client (JAR) 106. The Web Service Client 106 takes the Web Service Definition Language (WSDL) and turns it into a JAVA call 108. The JAVA call request message 108 will be stored in the database. All units of work are persisted in a neuron persisted queue 109 for resilience, elasticity and high availability.

Figure 4:
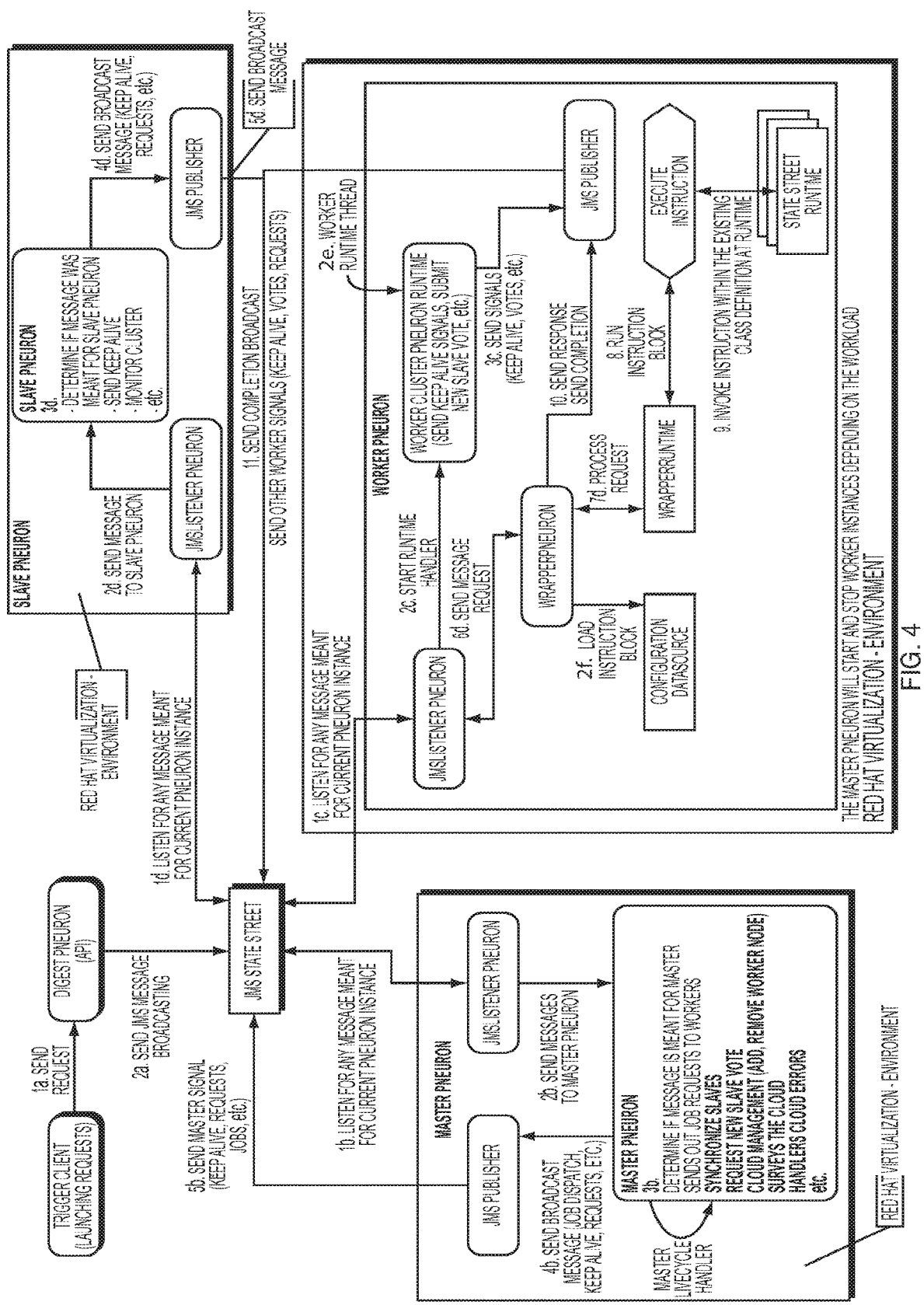
FIG. 4 is a schematic diagram and flowchart of a cloud integration model showing the interaction between master neurons, slave neurons and worker neurons in accordance with the teachings of the present invention.

The Web Service Client 106 sends a JMS broadcast 110 to subscribed Master and Slave Dispatchers 112. There can be any number of Masters and Slaves and generally the number is a result of the amount of volume at any given time. This enables a dynamic creation and destruction of neurons which in turn allows real time volume spikes to be managed simply, allows for maximum use of available system resources no matter where within the cloud they reside and enables real time application management. A more detailed view of the master, slave and worker neuron relationship is shown in FIG. 4 as outlined by steps 1a, and 2a performed by the digest pneuron; steps 1b, 2b, 3b, 4b, and 5b performed by the master pneuron; steps 1c, 2e, 2f, 3c, 6d, 7d, 8, 9, 10, and 11 performed by the worker pneuron; and steps 1d, 2d, 3d, 4d, and 5d performed by the slave pneuron.

The Master API obtains an instruction from the wrapped application (a message, a volume spike, a system crash, request to access from a location or any number of other instructions) and forwards it to the Dispatcher neuron. The Dispatcher neuron communicates with the Load and Queue Manager. If the Dispatcher is no longer the primary master—for example it goes down or the Hardware or data center supporting it is no longer accessible, the Slave will take over, applying the required units of work or activity spooling up more processing power, moving a message, cloning the application, providing secure access to the application to the requesting remote user.

The Load and Queue Manager keeps a running count of all units of work—or instructions and activities—and has to figure out which neuron Server 114 to hand it to for processing. Based on round robin and thresholds, it will hand the message to a Worker Instance. If all workers are busy or otherwise not available (for any reason), the Load and Queue Manager instantiates a new remote instance and server in real time. Based on thresholds, low work volume would remove remote instances and servers. The real time creation and destruction of instances, servers and nodes is a direct calibration to the volume of instructions and activities within the platform.

Inter-process communications occurs between the Master Dispatcher and the Slave Dispatcher to ensure the viability of the Dispatcher. If the communications are disrupted, the Slave Dispatcher will become the new Master dispatcher and a second take Slave over as Dispatcher the Master will be instantiated. This auto-hierarchy enables deep resiliency—if the Master fails (a server failure or data center crash) and the Master can no longer communicate and control the network, its queue, functions and all activities are instantly passed to a Slave which automatically becomes a Master.

The only time the Slave Dispatcher will get involved is switching from the master and it will use the persisted queue checkpoint 109 to start processing. When the slave becomes the master, it just re-queues everything.

The unit of work is passed from the Master neuron Server to the Remote neuron Server and the legacy wrapped neuron. The legacy wrapped neuron will perform the work. Multiple requests in flight are units of work. You can have applications or activities and have multiple neuron Servers. within a neuron Servers.

The neuron network will do the work directly. The load and capacity increasing and decreasing the Remote neuron Servers will similarly destroy and instantiate new Remote neuron Servers and un-persist the message from the queue (apply a dual message). The complete message neuron decrements the in-flight count to −1 (the in-memory queue).

Wrapped legacy applications 15 communicate and interface through neuron messaging protocols and initiates external transaction updates.

The benefits of the present invention include the ease of wrapping and incorporating existing applications into Cloud and distributed parallel processing infrastructure; rapid migration and transition to cloud infrastructures; automatic load and distribution of processing with platform-enabled instantiation of work queues, applications, and parallel processing on demand; and the ability to simultaneously process multiple concurrent applications sessions, reducing bottlenecks and accelerating complex, high resource processing into significantly shorter turnaround (processing jobs that take days can be reduced to hours and less).

Modifications and substitutions by one of ordinary skill in the art are considered to be within the scope of the present invention, which is not to be limited except by the allowed claims and their legal equivalents.

The invention claimed is:

1. A system for operating a legacy software application, comprising:
   a distributed processing service having networked hardware servers;
   a wrapper software object configured both to receive processing requests to the legacy software application from outside the distributed processing service and to send the processing requests using the distributed processing service;
   an encapsulated software object running on at least one of the networked hardware servers that includes the legacy software application and an exoskeleton connection service that is both configured to accept processing requests from the distributed processing service and mapped to an application programming interface of the legacy software application, wherein there are at least two of the encapsulated software objects;
   a load and queue manager configured to select an encapsulated software object from the at least two encapsulated software objects; and
   a dispatcher software object configured to receive the request sent by the wrapper software object and send the request to the selected encapsulated software object.

2. The system for operating the legacy software application of claim 1, wherein the load and queue manager includes:
   a load balance software object configured to monitor the at least two encapsulated software objects; and
   a queue management software object configured to monitor a queue of units of work sent to one of the at least two encapsulated software objects.

3. The system for operating the legacy software application of claim 1, wherein the load and queue manager is configured to select the selected encapsulated software object in a round robin of the at least two encapsulated software objects.

4. The system for operating the legacy software application of claim 1, wherein the load and queue manager is configured to select the selected encapsulated software object based on a threshold.

5. The system for operating the legacy software application of claim 1, wherein the load and queue manager is configured to cause an additional encapsulated software object to be created if the load and queue manager determines that each of the at least two encapsulated software objects are unavailable.

6. The system for operating the legacy software application of claim 5, further comprising a database configured to store a partial result of a previous execution of the encapsulated software object, and wherein the load and queue manager is configured to use the partial result as a parameter of the additional encapsulated software object.

7. The system for operating the legacy software application of claim 1, wherein the dispatcher object is configured to increment an in-flight count each when it sends a request to the selected encapsulated software object, and further comprising a complete message object configured to decrement the in-flight count upon receiving an indication that the selected encapsulated software object has completed processing the request.

8. A method for operating a legacy software application, comprising:

mapping, by a wrapper object in a cloud computing environment that includes a distributed processing service having networked hardware servers, a processing request written in an application programming interface of the legacy software application to the protocols of the distributed processing service;

sending, by the wrapper object through the distributed processing service, the mapped processing request to a dispatcher object;

sending, by the dispatcher object through the distributed processing service, the mapped processing request both to a load balance object and to a queue management object;

deploying, by either the load balance object or the queue management object and based on a load evaluation, an instance of an encapsulated software object into the cloud computing environment, wherein the load balance object and the queue management object are operable to create new nodes from the networked hardware servers;

sending, by the dispatcher to the instance of the encapsulated software object, the mapped processing request;

passing, by the instance of the encapsulated software object, the mapped request to the application programming interface of the legacy software application; and executing, by an instance of the legacy software application within the encapsulated software object on at least one of the networked hardware servers, the request.

9. The method for operating the legacy software application of claim 8, further comprising modifying, by an additional software object, the mapped processing request.

10. A system for operating a legacy software application, comprising:

a distributed processing service having networked hardware servers;

a wrapper software object configured both to receive processing requests to the legacy software application from outside the distributed processing service and to send the processing requests using the distributed processing service;

at least two encapsulated software objects that each include the legacy software application and an exoskeleton connection service that are both configured to accept processing requests from the distributed processing service and mapped to an application programming interface of the legacy software application, the at least two encapsulated software objects running on at least one of the networked hardware servers;

a load and queue manager configured to select an encapsulated software object from the at least two encapsulated software objects;

a master dispatcher object configured to receive the request sent by the wrapper software object and send the request to the selected one of the at least two encapsulated software objects; and a slave dispatcher object configured to perform the functions of the master dispatcher object in the event communication between the master dispatcher object and the slave dispatcher object are disrupted.

11. The system for operating the legacy software application of claim 10, wherein the master dispatcher object and the slave dispatcher object are configured to operate on different servers of the cloud computing environment.

* * * * *